May 19, 1925. 1,538,081

A. BANK

SUSPENSION FLOWERPOT

Filed May 18, 1923

INVENTOR.
Albert Bank
BY
George C. Heinrichs
ATTORNEY.

Patented May 19, 1925.

1,538,081

UNITED STATES PATENT OFFICE.

ALBERT BANK, OF GLENAVON, SASKATCHEWAN, CANADA.

SUSPENSION FLOWERPOT.

Application filed May 18, 1923. Serial No. 639,822.

*To all whom it may concern:*

Be it known that I, ALBERT BANK, a citizen of Poland, residing at Glenavon, Province of Saskatchewan, and Dominion of Canada, have invented certain new and useful Improvements in Suspension Flowerpots, of which the following is a specification.

This invention relates to improvements in suspension flowerpots, and it is the principal object of my invention to provide a device of this character, which will allow a watering of the flowers and at the same time contribute to the embellishment of a room.

Another object of the invention is the provision of a device of this character which is of a simple and inexpensive construction, and which can readily be installed in any room.

Further objects and advantages of my device will become more fully known, as the specification proceeds, and will then be specifically pointed out in the appended claim.

In the accompanying drawing, forming a material part of this disclosure:

Figure 1:
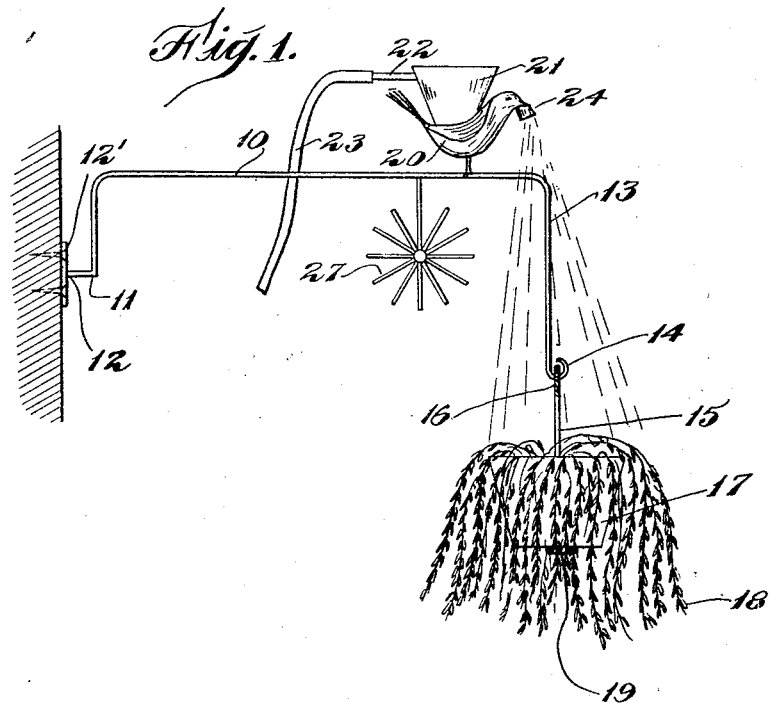
Figure 1 is a side elevation of a device constructed according to my invention.

The device embodies a strong wire or metal bar 10, having its bent end 11 attached to a bracket 12 adapted to be secured to a wall by means of nails 12′, while its other end is downwardly bent to form an arm 13 ending in a hook 14. A rod 15 provided with an eye 16 at its upper end by means of which it is suspended from hook 14, extends through the flowerpot 17 carrying flowers 18, and its lower screw threaded end carries a nut 19 below the bottom of the pot.

A hollow figure, for instance the representation of a bird 20 made of metal or other suitable material rests on bar 10 and carries a substantially funnel shaped container 21 on its back in communication with its body and provided with a nipple 22, to which one end of a flexible rubber hose or the like 23 is attached, the other end of which is adapted for attachment to a spigot or faucet of a source of water.

The bill of the bird is formed with a nozzle 24 through which the water may be sprayed upon the flowers 18.

Figure 2:
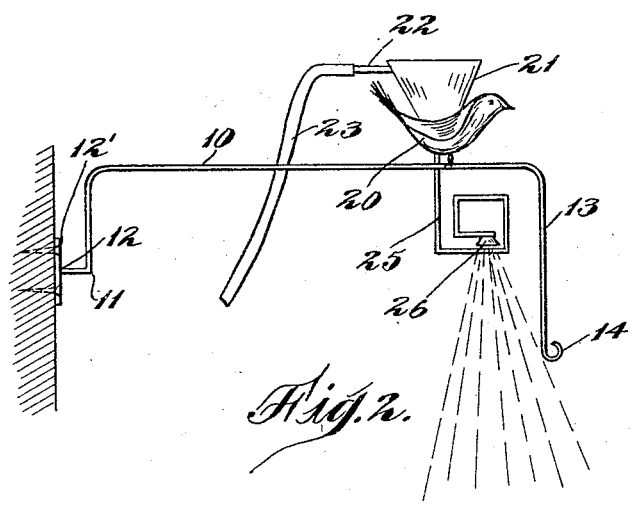
Figure 2 is a similar view of a modified form of my device.

The modified form of my invention illustrated in Figure 2 is substantially the same as described above, with the exception that the container 21 is provided with a pipe 25 extending through the body of the bird 20, and shaped as illustrated in Figure 2, ending into a nozzle or sprayer 26, through which the water is sprinkled upon the flowers 18 in pot 17, as soon as the hose 23 is connected with a water faucet and the water is turned on. A windmill 27 may be attached to bar 10 as illustrated in Figure 1.

The operation of the device is evident from the above description and needs no further explanation.

Changes may be made in the general arrangement and the construction of the minor details of my invention without deviating from the spirit and scope of the invention.

What I claim as new and desire to secure by Letters Patent of the United States is—

A suspension flowerpot, comprising a support adapted to be secured to and project outwardly from a fixture, said support having a depending outer terminal formed into a hook, a receptacle for flowers or the like having a stem projecting vertically therefrom and terminating in an eye to removably and swingingly engage said hook, and means carried by and rigid with said support to receive water from a suitable source of supply, said means being formed to deliver the water onto the flower in the pot.

In testimony whereof I have affixed my signature.

ALBERT BANK.